United States Patent
Ayers et al.

(10) Patent No.: US 7,555,542 B1
(45) Date of Patent: Jun. 30, 2009

(54) METHOD AND SYSTEM FOR DIRECTING REQUESTS FOR CONTENT TO A CONTENT SERVER BASED ON NETWORK PERFORMANCE

(75) Inventors: Matt Ayers, Seattle, WA (US); Benjamin J. Black, Seattle, WA (US); Chris Brown, Issaquah, WA (US); John Carlson, Seattle, WA (US); Dan Cohn, Prairie Village, KS (US); Scott Laird, Bothell, WA (US); Jonathan Miller, Seattle, WA (US); Stephen Ramsey, Seattle, WA (US); Ophir Ronen, Seattle, WA (US); Paul Schachter, Seattle, WA (US); Oscar Stiffelman, Seattle, WA (US)

(73) Assignee: Internap Network Services Corporation, Atlanta, GA (US)

( * ) Notice: Subject to any disclaimer, the term of this patent is extended or adjusted under 35 U.S.C. 154(b) by 979 days.

(21) Appl. No.: 09/575,839

(22) Filed: May 22, 2000

(51) Int. Cl.
G06F 15/73 (2006.01)

(52) U.S. Cl. .................. 709/223; 709/220

(58) Field of Classification Search ............ 709/223, 709/226, 225, 224, 229, 220; 395/200; 370/229; 705/36
See application file for complete search history.

(56) References Cited

U.S. PATENT DOCUMENTS

| | | | |
|---|---|---|---|
| 5,707,780 A | 1/1998 | Levergood et al. ..... 395/200.11 |
| 5,708,780 A | 1/1998 | Levergood et al. | |
| 5,712,979 A | 1/1998 | Graber et al. ........ 395/200.11 |
| 5,751,956 A | 5/1998 | Kirsch ............... 395/200.33 |
| 5,774,668 A * | 6/1998 | Choquier et al. ............ 709/223 |
| 5,802,302 A | 9/1998 | Waclawsky et al. .... 395/200.54 |
| 5,812,776 A | 9/1998 | Gifford ................ 395/200.47 |
| 5,845,215 A | 12/1998 | Henry et al. | |
| 5,856,981 A | 1/1999 | Voelker | |
| 5,991,705 A | 11/1999 | Klein et al. ............... 702/176 |
| 5,999,103 A | 12/1999 | Croslin | |
| 6,006,264 A * | 12/1999 | Colby et al. ............... 709/226 |
| 6,016,307 A | 1/2000 | Kaplan et al. | |
| 6,047,376 A | 4/2000 | Hosoe ................ 713/201 |
| 6,052,730 A | 4/2000 | Felciano et al. ........... 709/225 |
| 6,067,558 A | 5/2000 | Wendt et al. ............. 709/202 |

(Continued)

FOREIGN PATENT DOCUMENTS

WO   WO 00/11850   3/2000   ................. 29/6

OTHER PUBLICATIONS

PCT/US00/23879 International Search Report dated May 8, 2001.

(Continued)

*Primary Examiner*—Thanh Tammy Nguyen
(74) *Attorney, Agent, or Firm*—Kilpatrick Stockton LLP (57) ABSTRACT

A method and system for pointing a Internet user requesting access to content on a particular web site to one of a plurality of content servers associated with that web site based on one or more cost measurements associated with serving said content. The identification of the web site is mapped to the content servers associated with that web site. The user's IP address is then mapped to a particular content server based on a cost function and the IP address of the selected content server is provided to the user.

42 Claims, 5 Drawing Sheets

U.S. PATENT DOCUMENTS

| | | | | |
|---|---|---|---|---|
| 6,128,279 | A * | 10/2000 | O'Neil et al. | 370/229 |
| 6,138,162 | A | 10/2000 | Pistriotto et al. | 709/229 |
| 6,170,014 | B1 * | 1/2001 | Darago et al. | 709/229 |
| 6,173,322 | B1 | 1/2001 | Hu | 709/224 |
| 6,195,691 | B1 | 2/2001 | Brown | 709/219 |
| 6,243,750 | B1 | 6/2001 | Verma | 709/217 |
| 6,292,787 | B1 * | 9/2001 | Scott et al. | 705/36 |
| 6,295,275 | B1 | 9/2001 | Croslin | |
| 6,314,093 | B1 | 11/2001 | Mann et al. | |
| 6,343,323 | B1 | 1/2002 | Kalpio et al. | 709/229 |
| 6,360,262 | B1 * | 3/2002 | Guenthner et al. | 709/226 |
| 6,411,946 | B1 | 6/2002 | Chaudhuri | |
| 6,415,323 | B1 * | 7/2002 | McCanne et al. | 709/225 |
| 6,526,283 | B1 * | 2/2003 | Jang | 455/456 |
| 6,591,298 | B1 * | 7/2003 | Spicer et al. | 709/224 |

OTHER PUBLICATIONS

PCT/US00/23879 International Preliminary Examination Report dated Mar. 22, 2002.

* cited by examiner

METHOD AND SYSTEM FOR DIRECTING REQUESTS FOR CONTENT TO A CONTENT SERVER BASED ON NETWORK PERFORMANCE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to network communications, and more particularly to redirecting requests for content to a particular content server in a group of content servers based on a cost function indicative of operational characteristics of the network, such as network performance.

2. Description of the Background Art

One of the most common complaints of Internet users is that it simply takes too much time to access information. This is a particular concern for online vendors conducting e-commerce transactions. Many customers or potential customers may not return to a site if access is too slow, their browser locks up in the middle of a transaction, transactions are duplicated because they resubmit information as a result of believing that their browser has locked up during a transaction, or they are otherwise dissatisfied with the overall speed of accessing the site. While some of the problems experienced can be caused by the site itself, many of the problems experienced today are due to network performance.

One of the causes of unacceptable network performance is due to the fact that the Internet is a network of interconnected networks. As a result, more than one path may exist between the location at which the data originates and the destination to which the data will be delivered. Typically data is transmitted in "packets" which include a destination address. However, there is no guarantee that the route assigned to the data to reach that destination address will be the most efficient at all times due to the dynamic nature of network capability. For example, a path that is free at one point in time may become congested at another point in time. Or, a portion of the network may become unavailable, thus causing the packets to be re-routed after leaving the point of origin. Further, a network carrier who provides a portion of the intermediate path send the packets to another network carrier through a network access point if the destination is not a customer of that carrier, thereby resulting in data loss or additional re-routing. As can be seen, therefore, the packets must hop from network to network to reach their destination. The result is that each hop can contribute to additional delivery delay, or even cause a loss of data. The delivery delay that may be experienced can have a detrimental effect on the data transmission, and can be analogized to the decibel (db) loss experienced when signals are transmitted through a lossy medium.

Rather than pursue routing solutions, a number of companies are pursuing "content delivery" techniques in an attempt to enhance performance on the Internet. These content delivery techniques include caching, intelligent routing, and content optimizing, as described below.

For example, when an internet browser sends a request for a Web page, it first receives a hypertext markup language (HTML) file from the site that describes the Web page. The browser then sends one or more requests for the embedded files displayed on the Web page, such as images, audio clips, or video; that is the content. As can be seen, this process requires two or more requests for information to be made from the user to the Web page, thus having a direct impact on delivery time. To reduce the delivery time, some "content providers" cache the site's content on multiple servers at different geographical (physical) locations. Then, when a browser sends a request for a Web page, the HTML file that is sent back is accompanied by an internet protocol (IP) address that directs the browser to the geographically or topologically closest server that caches the content. The theory behind this approach is that the path to the server that is geographically or topologically closest to the user will be the fastest path.

A refinement of the foregoing approach has been to optimize content and route the content based on demand. For example, the content of a Web page can be separated into "objects" representing images, video, text, and audio which are then ranked by user demand. Based on this ranking, the objects are cached at servers that are geographically closest to the users demanding access to the objects. To do so, a real-time map of Internet traffic is maintained for determining to which servers to send the objects for caching based on demand.

While the foregoing techniques are designed to speed delivery of content to users, they all suffer from a common drawback; namely, that the path to the geographically closest location to the user may not be the optimum path. To the contrary, a path to an entirely different server that may not be the geographically or topologically closest may provide for a faster response time. Furthermore, such techniques do not direct a user to a particular content server based on a cost function in a closed loop system. Therefore, a need exists for a method and system for providing a user with the IP address of a content server based on criteria other than geography or topology alone. The present invention satisfies that need, as well as others, and overcomes the deficiencies in current techniques.

BRIEF SUMMARY OF THE INVENTION

The present invention generally comprises a method and system for pointing a user requesting access to content on a particular content server to one of a plurality of content servers that may provide that content. More particularly, the content server to which the user is directed is selected based on one or more criteria that satisfy a cost function indicative of operational characteristics of the network. The invention operates in a closed loop where additional cost measurements are made each time a user is directed to a content server and that information becomes part of the data store for evaluating which content server should be selected for serving subsequent requests for content.

For example, the user may be directed to a particular content server if the user can access that server more quickly than another content server. While that content server may also be closest to the user in physical space, the two locations do not necessarily have to coincide. Another example would be to direct the user to a content server based on one or more criteria that are indicative of best performance for that user. Another example would be to use reliability, such as least packet loss, to the content server as a performance criteria. Another example would be to direct the user to a particular content server based on economic or financial cost criteria. Still another example would be to use the geographical location of the content server as a performance criteria.

In other words, the invention directs a user to a content server based on a cost function that takes into account one or more cost criteria indicative of operational characteristics of the network. In this regard, note that the routing to a particular location is not being changed; routing is handled in a different manner through techniques described in, for example, U.S. Pat. No. 6,009,081 which is incorporated herein by reference. In the present invention, the user is being directed to an IP address of a particular content server.

By way of example, and not of limitation, the IP address of the client who is requesting the content and the ID of the customer whose content is being requested are determined. The customer's ID is mapped to one or more content servers where the customer's content is located. Then the client's IP address is mapped to one of those content servers based on performance data to ensure that the best performance is achieved. It is important to note that, while the best performance to a content server for a particular user is one measure of cost, it is not the only measure of cost that can be used to direct the user. Nor is best performance necessarily synonymous with the geographically or topologically closest content server. Instead, the content server is selected based on one or more criteria that may include an estimate of the best performance, such as fastest response, and which may or may not translate to the geographically or topologically closest content server. Based on one or more cost factors such as performance measurements, the client's IP address, the customer's ID, and the locations of the content servers, the present invention returns the IP address of the content server satisfying the cost function for that client. According to an optional aspect of the invention, all clients using the same DNS server would be treated as satisfying the same criteria for ease of implementation.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4A through FIG. 4F are diagrams depicting an alternative embodiment of the circular intersection technique shown in FIG. 3 which uses linear approximations.

DETAILED DESCRIPTION OF THE INVENTION

Figure 1:
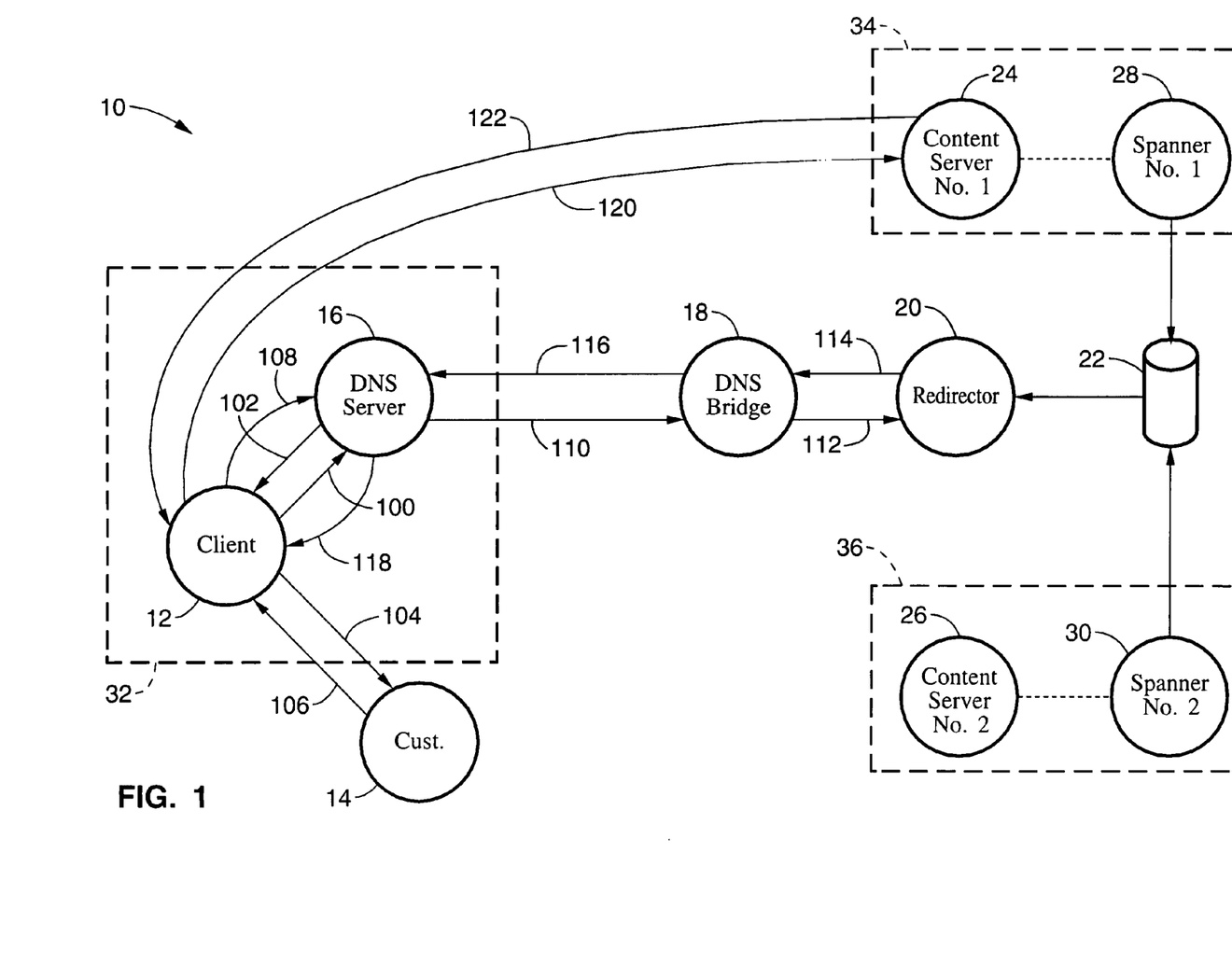
FIG. 1 is a system and data flow diagram showing configuration and operation of an embodiment of the present invention.

Referring first to FIG. 1, a schematic diagram of a network configuration 10 according to the invention is shown in the context of the Internet. FIG. 1 also depicts the preferred flow of information through the Internet according to the present invention. It will be appreciated, however, that the present invention is applicable to any interconnected network in which there are at least two servers within the network that contain the same content for a site that is being requested by a client. In the example that will be described, two content servers and three private network access points (PNAP) are shown. However, the invention can be applied to any number of content servers and PNAPs. It will further be appreciated that the invention is not limited to use in connection with PNAPs; to the contrary, the invention is applicable to any network or networks to which at least two content servers are connected. The invention is described in the context of PNAPs as part of the preferred system in which the invention can be implemented.

The premise of the present invention is that a client 12 desires to access content associated with a customer's Web site 14. By "client" we mean a computer that accesses a network such as the Internet through a connection, such as a PNAP. By "customer" we mean a network server, such as a Web site server, with which there is associated two or more content servers that may provide the desired content. In addition, by "content server" we mean a server with a unique internet protocol (IP) address, a group of servers with a common IP address, multiple data servers or the like, wherein the server(s) can be configured such that selection can be made from among two or more server addresses.

In the example described herein, which represents an embodiment of the system configuration in which the invention would be used, it is assumed that there is at least one PNAP, and preferably two PNAPs, connected to the Internet. It is also assumed that addressing is IP, that we are using HTTP and DNS, and that the customer will have two or more content servers connected to the same or different PNAPs. For example, one content server could be connected to a first PNAP, a second content server could be connected to a second PNAP, a third content server could be connected to a third PNAP, and so on. For purposes of this example, also assume that the IP address of client 12 is 10.0.0.1, that the uniform resource locator (URL) of Web site 14 is www.superperformance.com, that the IP address of the customer is 197.172.20.14, that the customer's identity (ID) is "superperformance", and that the client desires to access the home page www.superperformance.com which is "index.html". Again, however, the invention is applicable to any network configuration with multiple content servers, as well as to any IP service or addressing protocol.

In the example shown, client 12 will enter www.superperformance.com as the URL in their browser. At step 100, the client's browser sends a request for www.superperformance.com who, as stated before, is assumed to be a customer with content than can be accessed on two or more content servers located within one or more PNAPs. The request is received by a domain name system (DNS) server 16 that is maintained either by the client or by the client's internet service provider (ISP). At step 102, DNS server 16 returns 197.172.20.14 as the IP address for superperformance.com. At step 104, the client's browser sends a full page request to 197.172.20.14 which connects with the customer's Web site 14.

At step 106, Web site 14 returns the full html page, which describes the embedded content as well as a URL that includes a redirector host name. The redirector host name is a new protocol that is unique to the present invention, and which contains certain information that is used for determining which content server the client should access. In this example, the redirector host name would have the following basic format: client-ip.customer-id.lookup.pnap.net where client IP would correspond to 10.0.0.1, customer-id (e.g., customer identity) would correspond to "superperformance", and lookup.pnap.net would correspond to the address of a redirector DNS bridge (which is also a DNS server) which will be described below. Web site 14, which will know the client's IP address, will generate the redirector host name as part of the present invention.

The more complete form of the URL for the content in this example would be http://10-0-0-1.superperformance.lookup. pnap.net/index.html. It will be appreciated that other formats conveying the desired information could be used as well without departing from the present invention. For convenience, however, we have chosen to build a new layer on the existing DNS protocol. In other words, we have developed a new use of DNS. Instead of conventional IP to name mapping, we are creating an imaginary host name in a format that allows us to use DNS as the transport mechanism. The host name conveys additional information that is used for accessing the redirector DNS bridge and obtaining the IP address of the content server which provides best performance to the user.

With this in mind, at step 108 the client's browser then sends the redirector host name to DNS server 16 which will not recognize the redirector host name. DNS server 16 will know, however, to make a recursive query to redirector DNS bridge 18 at step 110 because "lookup.pnap.net" will be contacted as a matter of the normal DNS lookup mechanism.

At step 112 redirector DNS bridge 18 will send the client's IP address 10.0.0.1 and the customer ID "superperformance" to redirector 20. At step 114, using information in a dynamic database 22 or an alternative data store (including DNS bridge 18 itself), redirector 20 returns the IP address for the content server based on the client's IP address, the customer's ID, and cost information associated with accessing content servers containing the requested content. In the example shown, there are two content servers 24, 26 which replicate the requested content. At step 116, redirector DNS bridge 18 sends the IP address of content server 22 to DNS server 16. At step 118, DNS server 16 sends the IP address of content server 24 to client 12. At step 120, the client's browser then contacts content server 24 with the request to serve up the embedded content, and the requested content is sent to client 12 at step 122.

Note also that FIG. 1 shows two "spanners" 28, 30 associated with content servers 24, 26 respectively. Spanners 28, 30, which in this example are part of PNAPs 34, 36, respectively, monitor and collect the cost associated with the client's request to the content server (e.g., latency, performance, etc.) The cost data is used to determine which content server will be selected by redirector 20 in response to subsequent requests for content. In the example thus described, this would take place after the client's browser contacts content server 24 and before content server 24 serves up the requested content. The performance measurements can be stored in database 22 or alternative data store or even DNS bridge 18. As stated before, performance is one measure of cost which can be used to determine the content server to which the client will be directed. Other criteria can be used as well.

As can be seen, therefore, there are essentially three components to the process. One is the determination of the IP address of the client who is requesting the content and the ID of the customer whose content is being requested. The second is mapping the customer's ID to one or more content servers where the customer's content can be accessed. The third is mapping the client's IP address to a particular content server based on one or more criteria indicative of operational characteristics of the network, such as network performance. It is important to note that network performance is not necessarily synonymous with the fastest path, and that the fastest path is not necessarily synonymous with the geographically or topographically closest content server. Instead, the content server is selected based on an evaluation of cost, which may or may not translate to the fastest path, shortest response time, least packet loss, lowest economic cost of service, or the geographically or topographically closest content server for that client. The foregoing list is not all inclusive, but is provided by way of example of various measures of cost. Based on one or more measures of cost, the client's IP address, the customer's ID, and the IP addresses of the content servers, the redirector method of the present invention returns the IP address of the content server satisfying the cost function for that client.

As an alternative to using the form of the redirector host name described above, a simplified form could be used. Referring to the previously example, the simplified form would be "superformance.lookup.pnap.net". Note that the client's IP address has been dropped. In this embodiment of the invention, redirector 20 would base its decision on the IP address of DNS server 16 instead the client's IP address. In this way, all clients who are using the same DNS server would be directed to the same content server for "superperformance. com".

It will be appreciated, therefore, that the cost measurements should be continuously updated. It will also be appreciated that these measurements may contain information concerning, for example, latency and reliability between a client and the content servers. In the exemplary embodiment of the invention described herein, latency measurements are obtained by employing spanners 28, for populating and updating a data store such as database 22. A "spanner" as used herein is a software process which measures and records, for example, costs such as latency between a client and a destination in the network. Note that the preferred location of a spanner is in proximity to a content server so that the spanner can monitor the performance of the client's access to the content server. If a spanner were located elsewhere, then it would not be able to determine the cost characteristics of the request and transfer of content.

Referring to FIG. 1, assume for example that client 12 is connected to a first PNAP 32, and that content servers 24, 26 are connected to second 34 and third 36 PNAPs, respectively. In order to determine the cost associated with accessing a content server, data is collected between client 12 and the PNAPs 34, 36. For example, using the TCP/IP protocol, this is preferably done passively by watching the client's communications with destinations in a PNAP and measuring the time between the "syn ack" and the "ack" messages. The relative measurements between PNAPs can then be used to determine which content server can be accessed by the client with the least amount of network latency. It will be appreciated, however, that other handshakes may be employed if a protocol other than TCP/IP is used or developed. It will also be appreciated that there may be other suitable methods for making such measurements, including active methods such as pinging, that can be used as well, and that the invention is not limited to the foregoing passive method which is given by way of example as the preferred method.

Note also that cost measurements between all clients and all network locations (e.g., PNAPs) containing content servers may not be available. For ease of implementation, one solution would be to obtain one or more cost measurements for a client using a particular DNS server and then treat all clients using that same DNS server as if the costs were equivalent. Still another approach would be to obtain one or more cost measurements and then correlate those measurements with other clients who may be similarly situated (e.g., geographically). Still another approach would be to use initial randomization associated with directing a client to a particular content server. For example, initially we may direct the client to PNAP 34 and content server 24. At that point in time, a cost measurement such as latency can be made. The next time that the client requests content we may force the client to go to PNAP 36 and content server 26 where a measurement has not yet been made. In this regard, it will be appreciated that complete information can be obtained by iterating the measurements over all possibilities. It will also be appreciated that other approaches to making cost measurements may be suitable as well.

It should be apparent that randomization may be useful for normal system operation as well as initial operation of the system. As can be seen, we essentially need up-to-date cost measurements from each cluster or set of IP addresses (rather than each IP address) to each content server (i.e., to PNAP in which a content server is located). Therefore, even though we may have a measurement for PNAP 24, we may send the client to PNAP 36 instead to get a measurement. The amount of time a client is sent to a different PNAP would be arbitrarily set, such as ten percent of the time. Further, suppose that several prefixes want to access "superperformance.com" and that one thousand customers in a prefix want to contact the site. The randomization could be applied to clusters or sets of IP addresses, such as prefixes. This allows us to strike a balance between exploration (e.g., making cost measurements) and exploitation of information (e.g., designating a content server). Otherwise, if the client is always directed to what was previously determined to be the least cost (e.g., best performing) content server for that client, we would never obtain measurements for other content servers for that client. This "overexploitation" of measurements could lead to less than desirable performance since a different content server may satisfy the cost function for that client. On the other hand, if we are always exploring (making measurements), we will never exploit the measurements.

Accordingly, every time a client accesses a content server, the client provides performance data about that content server that can be observed by a spanner to measure and record performance, as well as provides data which can be used as an estimate of performance for the cluster or set of IP addresses containing the client's IP address. Therefore, it is possible to learn how long it takes for the client (and the group of addresses) to access the destination. When the invention directs the client to the content server that gives best performance, the system also obtains information about the client. It will be appreciated that, by sending the client to a different content server part of the time, the system adapts over time.

While the preferred approach to obtaining and maintaining the cost measurement data has been described, it may not be practical to monitor the performance or other criteria from every client's IP address or every set of addresses (e.g., such as prefixes) to a PNAP due to the large number of measurements that are required. For example, there are approximately seventy thousand prefixes in use; therefore, the number of measurements that would be required would be seventy thousand times the number of PNAPs. If prefixes are close together geographically, however, an inference can be made that physically proximate prefixes will experience similar network performance. In other words, a predictive characteristic can be added to the operation of the redirector in order to reduce the number of measurements that are required. A particularly suitable technique is to employ circular intersection to identify the geographical location of clients and then group IP addresses based on correlation of locations.

Figure 2:
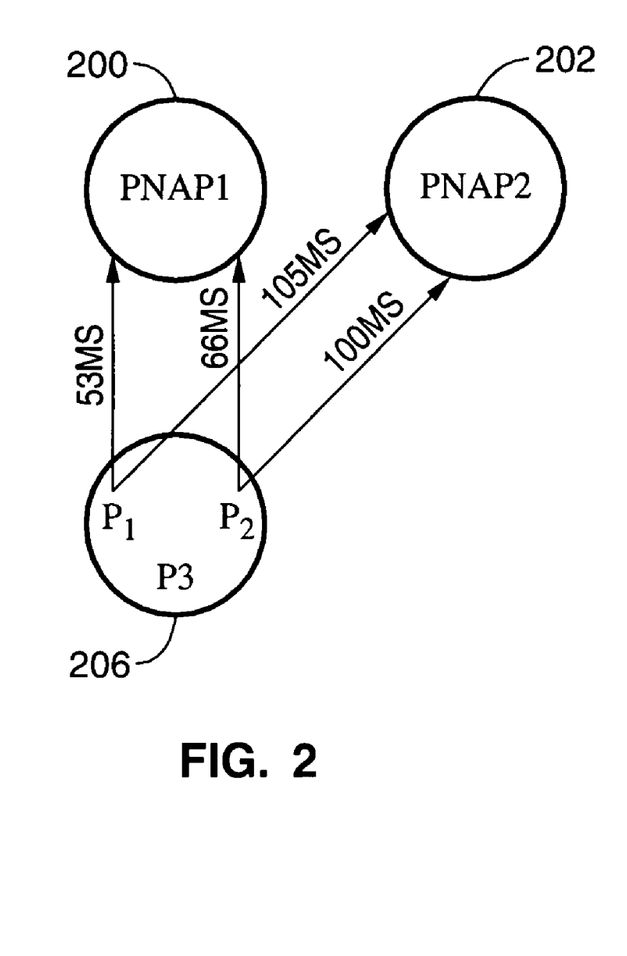
FIG. 2 is a diagram depicting a geographical inference method according to the present invention.

For example, referring to FIG. 2, suppose that there are multiple clients with sets of IP addresses (e.g., prefixes) P1, P2 and P3 connected to a PNAP 200. Using circular intersection techniques according to the present invention, we can determine the physical location of a set of IP addresses. In the preferred embodiment of the invention, this can be accomplished by first obtaining latency measurements between a client and PNAP 200 whose latitude and longitude is known. The minimum latency measurement in the set generally represents the most accurate measurement for purposes of circular intersection according to the invention. For example, if one-thousand latency measurements are obtained, all of the measurements except for the minimum measurement would be disregarded. The minimum latency measurement can then be converted to a distance equivalent by multiplying the measurement by the speed of light and dividing by two in the case of a round trip measurement such as is obtaining by a ping. Note, however, that this computation may overshoot the actual distance to the client in most networks due to the use of optic fiber in the network and the fact that light actually travels at a lower speed in fiber. However, only an estimate needs to be made for purposes of circular intersection according to the present invention.

In the case of FIG. 2, the minimum latency measurements from PNAP1 200 to P1 and P2 are 53 ms and 66 ms, respectively, and the minimum latency measurements from PNAP 202 to P1 and P2 are 105 ms and 100 ms, respectively. Using this information, circles can then be drawn where the PNAP location is the center of the circle and the distance equivalent of the latency is the radius of the circle. In this regard, it will be appreciated that shorter return times result in smaller (i.e., tighter) circles, thus providing more precise measurements. It will also be appreciated that any test that measures the time that it takes for a signal or data to move to a location and back can be employed without departing from the invention, and that one way of making such a measurement is by sending a TCP/IP "ping" to the client from the PNAP.

Figure 3:
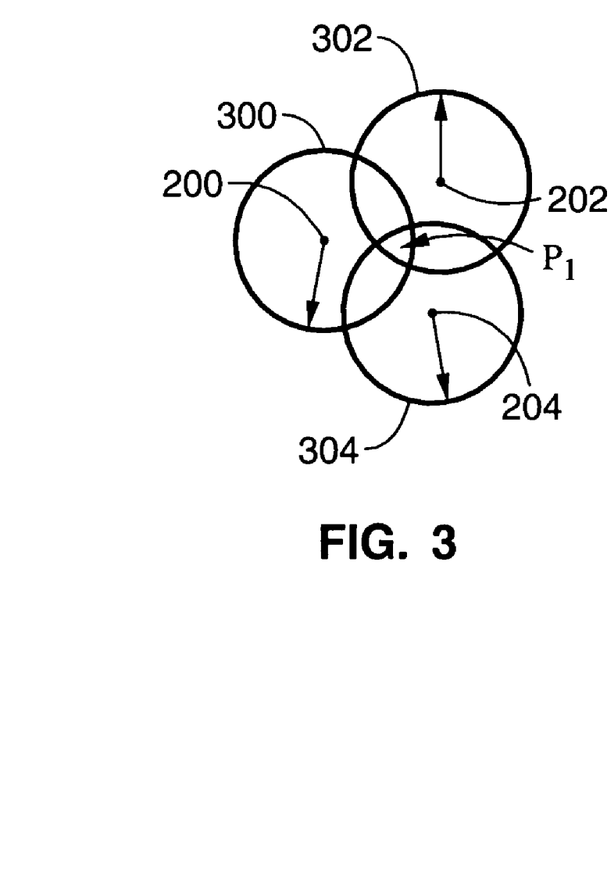
FIG. 3 is a diagram depicting a circular intersection locating technique according to the present invention.

Referring also to FIG. 3, by taking similar measurements from multiple PNAPs 200, 202, 204, several circles such as circles 300, 302, 304 can be drawn and the intersection of the circles will correspond to the approximate physical location of the sets of IP addresses (e.g., a prefix), although the exact location will not be known for a number of reasons, including the fact that light travels at a slower speed through fiber. In this example, the intersection of the circles is the approximate location of P1. An inference can then be made for sets of IP addresses that are physically close, but for which no actual measurements have been made; namely, that clients will experience similar network conditions. Therefore, in the example of FIG. 2, assume that measurements were taken for P1 and P2, but not for P3. If P3 is physically close to P1 and P2, a circle of inference 206 can be drawn for P3. This assumes, however, that set P3 was located one point in time so we know that set P3 is in the circle of inference for sets P1 and P2.

It should be apparent from the foregoing discussion that the sets of IP addresses can vary in size and, in addition, that once a circle of inference is drawn around sets of IP addresses, those sets can be used for drawing new circles of inference. For example, suppose that P1, P2 and P3 are sets of one. Once the circle of inference 206 is drawn around those sets, their combination can form a new set P4 (not shown). Now, assume that P5 (not shown) falls within the circle of inference for set P4. A new inferred set can then be created, which is the combination of P4 (P1, P2 and P3) and P5. Therefore, we can create new sets and sets of sets using this method.

Note that it is possible to implement circular intersection more efficiently by employing an approximation technique. Determining the intersection of a set of circles as the number of circles increases using conventional computational techniques can become computationally complex since the relationship between time that it takes to compute the intersections and the increased number of intersections is not linear. A linear approximation, on the other hand, is the fastest way to implement circular intersection even though it is not as accurate. This can be accomplished, for example, by summarizing the previous intersections with an intersection object. The intersection object is then intersected with a subsequent circle or another object representing that circle. Each time that an intersection is determined, the intersection is summarized with a new intersection object that is used for purposes of subsequent intersections.

Figure 4A:
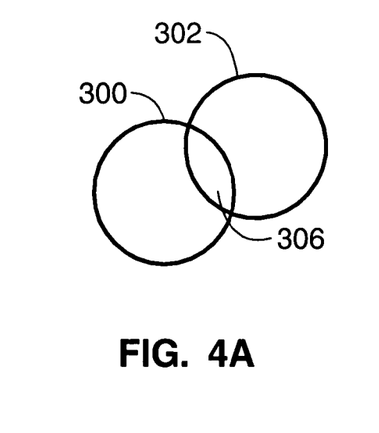
Figure 4B:
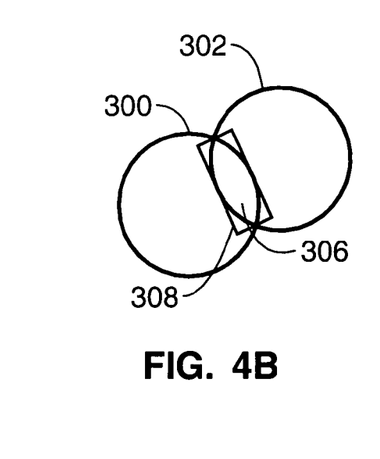
Figure 4C:
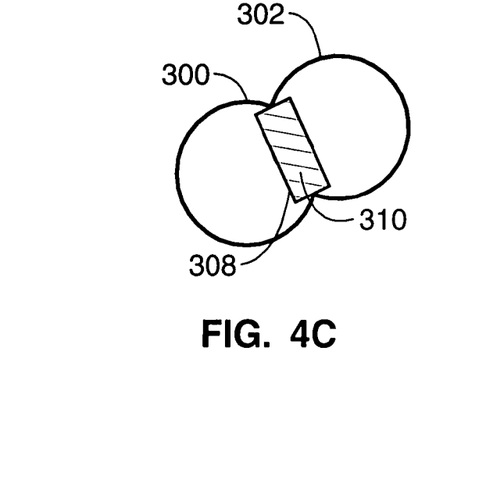
Figure 4D:
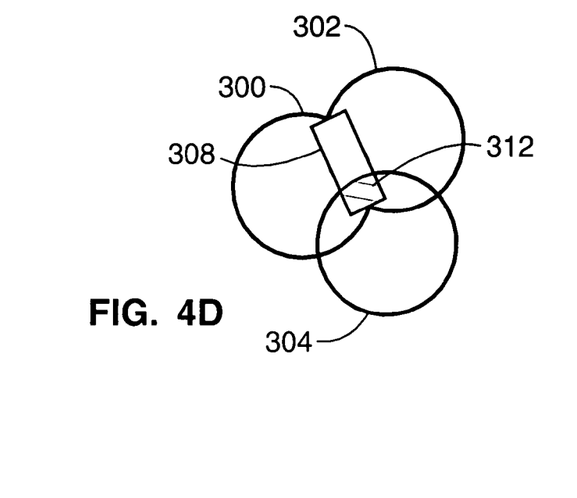

For example, suppose that we have three circles 300, 302 and 304 as described before. A linear approximation of the intersection can be determined as follows. First, the intersection 306 of two of the circles, such as circles 300, 302 would be determined as shown in FIG. 4A. Next, the area of intersection can be circumscribed by an intersection object 308, which is preferably rectangular in shape as shown in FIG. 4B. The intersection object 308 should represent the smallest bounding box that encloses the intersection. Referring also to FIG. 4C, the estimated intersection is the cross-hatched 310 area inside intersection object 308. Now, when the third circle 304 is drawn, the intersection of circle 304 and intersection object 308 can be determined. In the example shown in FIG. 4D, the intersection of circle 304 and intersection object 308 is shown as the cross-hatched area 312. However, since the intersection still involves taking curvature into account, computational efficiency can still be optimized. This can be accomplished by replacing circle 304 with a rectangular-shaped object representing circle 304, such as square 314 shown in FIG. 4E which circumscribes circle 304. The intersection is shown as the cross-hatched area 316 bounded by a new rectangular-shaped intersection object 318.

Figure 4E:
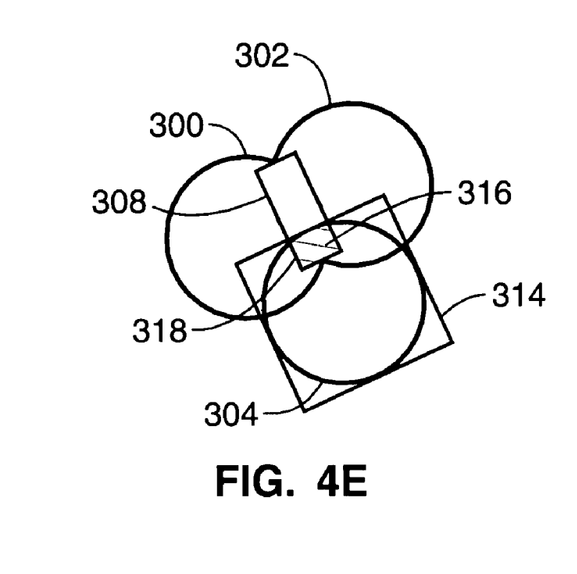

Intersection object 318 would then be used for the next intersection with a circle by again replacing the circle with a rectangular-shaped object representing that circle. As can be seen, therefore, each intersection creates a new intersection object that can be used for a subsequent intersection.

Figure 4F:
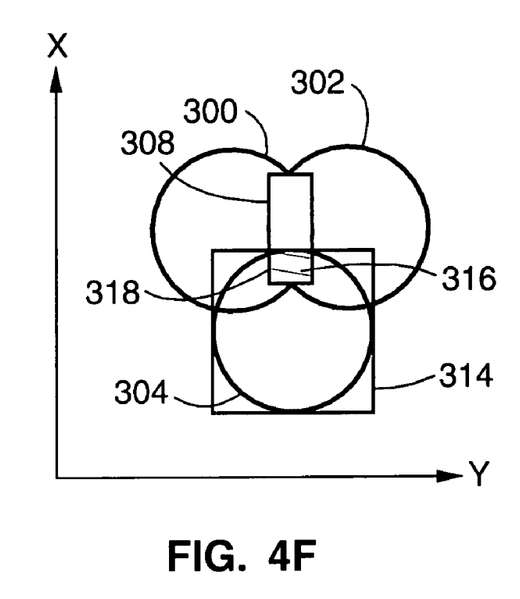

In order to reduce computational complexity, note in FIG. 4E that square 314 has been aligned with intersection object 308 such that corresponding sides are parallel. This ensures that intersection object 318 is rectangular-shaped. To further reduce computational complexity, it is also possible to rotate the coordinate system of the intersecting circles so that the longitudinal axis through intersection object 308 is oriented vertically and aligned with the vertical axis in a normal Cartesian coordinate system as shown in FIG. 4F. Additional refinements include, but are not limited to:

(1) if one circle contains another circle, discarding the larger circle to provide a tighter intersection;

(2) if more than two circles in a set are to be intersected and the circles are similar in size, starting with the two circles that are the farthest apart;

(3) if more than two circles in a set are to be intersected and the circles are different in size, starting with the two circles having the smallest radii to provide the tightest intersection.

Therefore, the above-described method summarizes previous intersections with an intersection object. The intersection object is then intersected with a subsequent circle or an object representing the subsequent circle. While the intersection objects are preferably rectangular-shaped as described above, they could alternatively have other shapes that are also polygons. The method reduces computational complexity and increases computational speed by employing a linear computation technique, at the expense of accuracy, rather than employing a technique that is not linear. In other words, if n represents the number of circles being intersected, the computational complexity for exact intersection is $O(n^3)$ whereas it is $O(n)$ in the approximation method described above.

Accordingly, it can be seen that a spanner measures performance characteristics while circular intersection estimates the physical location of a client. Accordingly, circular intersection is an operational tool that can be used to speed up populating the store of cost measurements when actual measurements are not available; it is not, however, an essential part of the invention.

Figure 5:
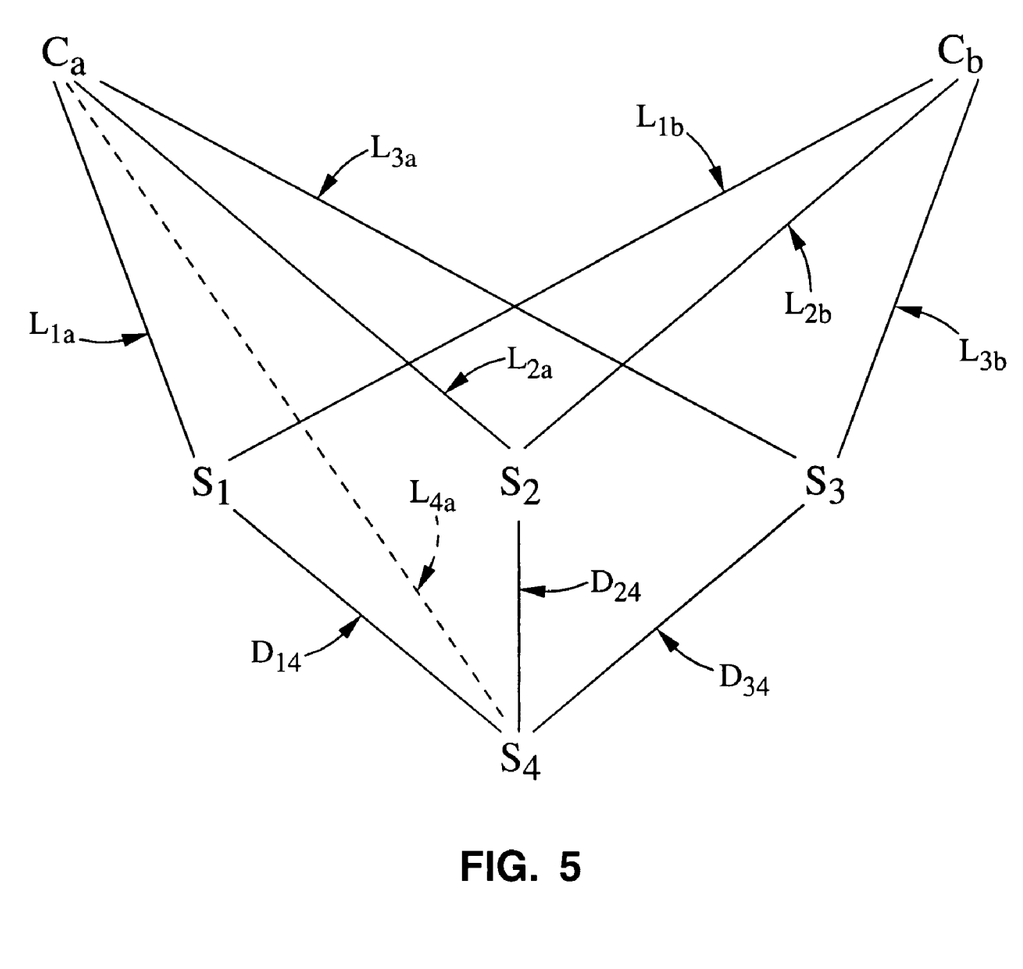
FIG. 5 is a diagram depicting an intelligent inference technique according to the present invention.

Referring now to FIG. 10, an "intelligent inference" method according to the invention will be described which is more accurate than drawing a circle of inference around physically proximate sets of IP address as was described previously in connection with FIG. 2. In FIG. 4, let Ca represent a first content server, let Cb represent a second content server, let $S_1$, $S_2$, $S_3$ and $S_4$ represent sets of IP addresses, let L represent latency, and let D represent distance. We can use a spanner to obtain latency measurements from content server Ca to $S_1$ ($L_{1a}$), $S_2$ ($L_{2a}$) and $S_3$ ($L_{3a}$), and use circular intersection to determine the distances between $S_1$ and $S_4$ ($D_{14}$), $S_2$ and $S_4$ ($D_{24}$), and $S_3$ and $S_4$ ($D_{34}$). With this information, we can obtain a weighted average of latency measurements to infer the latency measurement $L_{4a}$ from content server Ca to S4 as follows:

$$L_{4a} \approx \left(\frac{1}{D_{14}}(L_{1a}) + \frac{1}{D_{24}}(L_{2a}) + \frac{1}{D_{34}}(L_{3a})\right)\left(\frac{1}{\frac{1}{D_{14}} + \frac{1}{D_{24}} + \frac{1}{D_{34}}}\right)$$

By taking the weighted average in this manner, we obtain an approximation of the latency from content server Ca to $S_4$. Note also that inferences can be made in other ways, including, but not limited to, the following:

1. Monitoring sets of IP addresses and then treating all IP addresses in the set in the same fashion.

2. Aggregating prefix groups based on similarities and treating all such aggregated prefix groups in the same fashion.

3. Disaggregating prefix groups into subgroups that have similar characteristics and treating the subgroups in the same fashion.

4. Placing IP addresses into sets based on some criteria of similarity such as, but not limited to, performance, geographical location, and other correlation factors, and treating all IP addresses in the sets in the same fashion.

In other words, inferences are ideally made based on sets of IP addresses. A set can be a single IP address (e.g., a set of one), a group of IP address in a BGP4 prefix if the prefix is small, the union of two sets wherein the two sets are geographically close, the union to sets wherein the two sets experience similar performance in relation to content servers, and the like.

Therefore, it will be appreciated that efficient implementation of the present invention requires cost measurements about the network that can used to determine if directing a client to a particular content server will satisfy a cost function, and it will further be appreciated that the decision may be irrespective of the actual physical location of the client and the content server. Initially, however, cost measurements may not be available for all clients and content servers. As are result, some amount of randomization or estimation may be necessary until the system is trained and the store of performance data is populated. In addition, knowledge of the physical location of the client and/or sets of IP addresses may be helpful for drawing an inference that proximate physical locations may experience similar network conditions. Such inferences can be used as an alternative to obtaining measurements from each client IP address to each PNAP or content server. Note, however, that some measurements, such as latency, need to be updated frequency due to changes in network conditions whereas geographical locations of clients are static. Therefore, inferences should be drawn close in time to when measurements of a dynamic nature are made.

It will also be appreciated that the system of the present invention will automatically balance network load among PNAP's. Another load balancing option would be to provide the customer with a software interface that allows them to report load on the content servers so that redirection can also be based on balancing server load.

It will be appreciated that the method and system would preferably be implemented using a programmed data processor such as a computer and associated software to carry out the functions described herein. For example, DNS bridge 18, redirector 20, and spanners 28, 30 would be implemented as software running on a programmed data processor such as a conventional computer. Those skilled in the art will appreciate that the actual code to implement the invention as described herein can be written for various platforms using conventional programming techniques. Accordingly, the details of the code are not presented herein.

As can be seen, therefore, the invention provides for obtaining cost measurements of various types associated with serving a request for content to a user and directing the user to a particular content server based in satisfaction of a cost function indicative of operational characteristics of the network. The invention operates in a closed loop wherein an additional cost measurement is made each time a user is directed to a content server and that information becomes part of the data store for evaluating which content server should be selected for serving subsequent requests for content from that content server.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for directing a first network client requesting access to content to one of a plurality of content servers that can provide said content, comprising:

if one or more cost measurements am available that measure operational characteristics of the network based on communication between the first network client and one or more of the plurality of content servers, then directing the first network client to a said one of said content servers based on the one or more cost measurements;

otherwise, directing the first network client to a said one of said content servers using one or more cost measurements that measure operational characteristics of the network, based on communication between a second client that is physically proximate to the first network client and one or more of the plurality of content servers.

2. A method as recited in claim 1, further comprising:

obtaining a new cost measurement when said first network client accesses said content server;

and using said new cost measurement as an indicator of operational characteristics of the network in connection with subsequent requests for access to said content that can be provided by said content server.

3. A method as recited in claim 1, wherein said content servers are associated with a network server having an identity, and wherein said network client requests content from said network server, and further comprising: mapping the identity of the network server to said content servers.

4. A method as recited in claim 1 further comprising measuring network performance between said first network client and a said one of said content servers.

5. A method as recited in claim 4, further comprising measuring network performance between said first network client and another of said content servers.

6. A method as recited in claim 1, wherein an attribute of network performance comprises network latency.

7. A method as recited in claim 6, wherein network latency is measured passively by determining the time between a syn ack message sent by said first network client and an ack message sent by one of said content servers.

8. A method as recited in claim 1, further comprising determining the location of said first network client by circular intersection.

9. A method as recited in claim 8, wherein said circular intersection comprises:

(a) measuring the time that it takes for data to move from a plurality of network server locations to said first network client;

(b) converting said times to distance equivalents;

(e) determining a plurality of intersecting circles, wherein said distance equivalents are used as the radii of the circles and said network server locations are used as the centers of the circles; and (d) determining the physical location of said first network client from the intersection of said circles.

10. A method as recited in claim 1, further comprising inferring network performance of serving said first network client from said content server by determining a weighted average of network performance between, said content server and other network clients based on physical proximity of said other network clients to said network client and performance of said content server for said other network clients.

11. A method as recited in claim 1, further comprising:

(a) measuring network latency between a content server and a plurality of other network clients;

(b) determining physical distances between said other network clients and said first network client;

(e) computing a weighted average of said latency measurements as a function of said distances, wherein stud weighed average comprises an estimate of the latency between said content server and said first network client; and (d) inferring operational characteristics associated with a plurality of network clients to said first network client using said weighted average.

12. A method for directing a first network client requesting access to content from a network server to one of a plurality of content servers that can provido said content, each said content server having an address, said network server having an identity, said method comprising:

(a) identifying the network server associated with the content requested by said network client;

(b) if one or more cost measurements are available that measure operational characteristics of the network based on communication between the first network client and one or more of the plurality of content servers, then identifying a said one of said content servers based on said identity of said network server and the one or more cost measurements;

otherwise, identifying a said one of said content servers based on said identity of said network server and one or more cost measurements that measure operational characteristics of the network based on communication between a second client that is physically proximate to the first network client and one or more of the plurality of content server; and (c) providing the first network client with the address of said content server identified in step (b).

13. A method as recited in claim 12, further comprising:

(d) obtaining a new cost measurement when said first network client accesses said content server; mid (e) using said new cost measurement as an indicator of operational characteristics of tile network in connection with subsequent requests for access to said content that can be provided by said content server.

14. A method as recited in claim 12, further comprising Measuring network performance between said first network client and a said one of said content servers.

15. A method as recited in claim 12, wherein an attribute of network performance comprises network latency.

16. A method as recited in claim 15, wherein network latency is measured passively by determining the time between a syn ack message sent by said first network client and an ack message sent by said one of said content servers.

17. A method as recited in claim 14, further comprising measuring network performance between said first network client and another of said content servers.

18. A method as recited in claim 12, determining the location of said first network client by circular intersection.

19. A method as recited in claim 18, wherein said circular intersection comprises:

(a) measuring the time that it takes for data to move from a plurality of network server locations to said first network client;

(b) converting said times to distance equivalents;

(c) determining a plurality of intersecting circles, wherein said distance equivalents are used as the radii of the circles and said network server locations are used as the centers of the circles; and (d) determining the physical location of said first network client from the intersection of said circles.

20. A method as recited in claim 12, further comprising inferring network performance of serving said first network client from said content server by determining a weighted average of network performance between said content server and other network clients based on physical proximity of said other network clients to said first network client and performance of said content server for said other network clients.

21. A method as recited in claim 12, further comprising:

(a) measuring network latency between a content server and a plurality of other network clients;

(b) determining physical distances between said other network clients and said first network client;

(c) computing a weighted average of said latency measurements as a function of said distances, wherein said weighed average comprises an estimate of the latency between said content server and said first network client; and (d) inferring operational characteristics associated with said other network clients to said first network client using said weighted average.

22. A system for directing a first network client requesting access to content to one of a plurality of content servers that can provide said content, comprising:

a programmed data processor; and programming associated with said programmed data processor for:

determining whether one or more cost measurements are available that measure operational characteristics of the network based on communication between the first network client and one or more of the plurality of content servers, if so, then directing the first network client to a said one of said content servers based on the one or more cost measurements;

if not, then directing the first network client to a said one of said content servers using one or more cost measurements that measure operational characteristics of the network based on communication between a second client that is physically proximate to the first network client and one or more of the plurality of content servers.

23. A system as recited in claim 22, further comprising programming associated with said programmed data processor for:

obtaining a new cost measurement when said first network client accesses said content server;

and using said new cost measurement as an indicator of operational characteristics of the network in connection with subsequent requests for access to said content that can be provided by said content server.

24. A system as recited in claim 22, wherein said content servers are associated with a network server having an identity, and wherein said first network client requests content from said network server, and further comprising:

programming associated with said programmed data processor mapping the identity of the network server to said content servers.

25. A system as recited in claim 22, further comprising programming associated with said programmed data processor for measuring network performance between said first network client and a said one of said content servers.

26. A system as recited in claim 22, wherein an attribute of network performance comprises network latency.

27. A system as recited in claim 26, wherein network latency is measured passively by determining the time between a syn ack message sent by said first network client and an ack message sent by one of said content servers.

28. A system as recited in claim 25, further comprising programming associated with said programmed data processor for measuring network performance between said first network client and another of said content servers.

29. A system as recited in claim 22, further comprising programming associated with said programmed data processor for determining the location of said first network client by circular intersection.

30. A system as recited in claim 29, wherein said circular intersection comprises:
(a) measuring the time that it takes for data to move from a plurality of network server locations to said first network client;
(b) converting said times to distance equivalents;
(c) determining a plurality of intersecting circles, wherein said distance equivalents are used as the radii of the circles and said network server locations are used as the centers of the circles; and
(d) determining the physical location of said first network client from the intersection of said circles.

31. A system as recited in claim 22, further comprising programming associated with said programmed data processor for inferring network performance of server said first network client from said content server by determining a weighted average of network performance between said content server and other network clients based on physical proximity of said other network clients to said first network client and performance of said content server for said other network clients.

32. A system as recited in claim 22, further comprising programming associated with said programmed data processor for:
(a) measuring network latency between a content server and a plurality of other network clients;
(b) determining physical distances between said other network clients and said first network client;
(c) computing a weighted average of said latency measurements as a function of said distances, wherein said weighed average comprises an estimate of the latency between said content server and said first network client; and
(d) inferring operational characteristics associated with a plurality of network clients to said first network client using said weighted average.

33. A system for directing a first network client requesting access to content from a network server to one of a plurality of content servers that can provide said content, each said content server having an address, said network server having an identity, said method comprising:
(a) a programmed data processor; and
(b) programming associated with said programmed data processor for
(i) identifying a the network server associated with the content requested by said first network client;
(ii) if one or more cost measurements are available that measure operational characteristics of the network based on communication between the network client and one or more of the plurality of content servers, then identifying a said one of said content servers based on said identity of said network server and the one or more cost measurements; and
(iii) otherwise, identifying a said one of said content servers based on said identity of said network server and one or more cost measurements that measure operational characteristics of the network based on communication between a client that is physically proximate to the first network client and one or more of the plurality of content servers; and
(c) providing the first network client with the address of said content server identified in step (b).

34. A system as recited in claim 33, further comprising programming associated with said programmed data processor for:
obtaining a new cost measurement when said network client accesses said content server; and
using said new cost measurement as an indicator of operational characteristics of the network in connection with subsequent requests for access to said content that can be provided by said content sewer.

35. A system as recited in claim 33, timber comprising programming associated with said programmed data processor for measuring network performance between said first network client and a said one of said content servers.

36. A system as recited in claim 35, wherein an attribute of network performance comprises network latency.

37. A system as recited in claim 36, wherein network latency is measured passively by determining the time between a syn ack message seat by said network client and an ack message sent by said one of said content servers.

38. A system as recited in claim 35, further comprising programming associated with said programmed data processor for measuring network performance between said first network client and another of said content servers.

39. A system as recited in claim 33, further comprising associated with said programming data processor for determining the location of said first network client by circular intersection.

40. A system as recited in claim 39, wherein said circular intersection comprises:
(a) measuring the time that it takes for data to move from a plurality of network server locations to said first network client;
(b) converting said times to distance equivalents;
(c) determining a plurality of intersecting circles, wherein said distance equivalents are used as the radii of the circles and said network server locations are used as the center of the circles; and
(d) determining the physical location of said first network client from the intersection of said circles.

41. A system as recited in claim 33, further comprising programming associated with said programmed data processor for inferring network, performance of serving said first network client from said content server by determining a weighted average of network performance between said content server and other network clients based on physical proximity of said other network clients to said first network client and performance of said content server for said other network clients.

42. A system as recited in claim 33, further comprising programming associated with said programmed data processor for:
(a) measuring network latency between a content server and a plurality of other network clients;
(b) determining physical distances between said other network clients and said first network client;
(c) computing a weighted average of said latency measurements as a function of said distances, wherein said weighed average comprises an estimate of the latency between said content server and said network client; and
(d) inferring operational characteristics associated with a plurality of network clients to said network client using said weighted average.

* * * * *